United States Patent [19]

Ingalls

[11] 4,078,365

[45] Mar. 14, 1978

[54] TREE NUT WINDROWING BLOWER WITH AUTOMATIC OSCILLATING BLOWER DISCHARGE

[75] Inventor: Ernest E. Ingalls, Hughson, Calif.

[73] Assignee: Gould Paper Corporation, New York, N.Y.

[21] Appl. No.: 722,593

[22] Filed: Sep. 13, 1976

[51] Int. Cl.² .......................................... A01D 51/00
[52] U.S. Cl. ................................... 56/328 R; 15/340; 15/405; 56/10.2; 239/78
[58] Field of Search .................... 56/328 R, 12.8, 329, 56/10.2; 47/1.2, 2; 15/405, 340, 363, 364; 239/77, 78, 142, 513, 666

[56] References Cited

U.S. PATENT DOCUMENTS

| | | | |
|---|---|---|---|
| 2,561,882 | 7/1951 | Patton | 56/328 R |
| 3,455,502 | 7/1969 | Pool et al. | 56/328 R |
| 3,539,271 | 11/1970 | Greenwood | 239/78 |
| 3,586,237 | 6/1971 | Taylor | 239/78 |
| 3,879,888 | 4/1975 | Riley | 47/1.7 |

Primary Examiner—Jay N. Eskovitz
Attorney, Agent, or Firm—Clarence A. O'Brien; Harvey B. Jacobson

[57] ABSTRACT

A mobile ground vehicle is provided intended to move along a path oriented in predetermined position relative to the vehicle and blower structure is mounted on the vehicle and includes an outlet opening outwardly from the vehicle laterally of the aforementioned path. Deflector structure is operatively associated with the outlet for variably deflecting the discharge of air from the outlet through an arch of angular deflection disposed in a plane generally paralleling the aforementioned path and including extremes inclined in opposite directions along the path. Drive structure is operatively associated with the deflector structure for driving the latter between the extremes of angular deflection thereof and object sensor structure is carried by the vehicle for sensing objects past which the vehicle is moved. Further, actuator structure is operatively associated with the sensor structure and drive structure for actuating the latter to oscillate the deflector structure between the extremes of angular deflection thereof in response to the sensor structure sensing an object being past by the vehicle and the drive structure is operative to effect fast movement of the deflector structure from one extreme to the other and slow movement of the deflector structure back to its starting position.

14 Claims, 8 Drawing Figures

Fig. 4
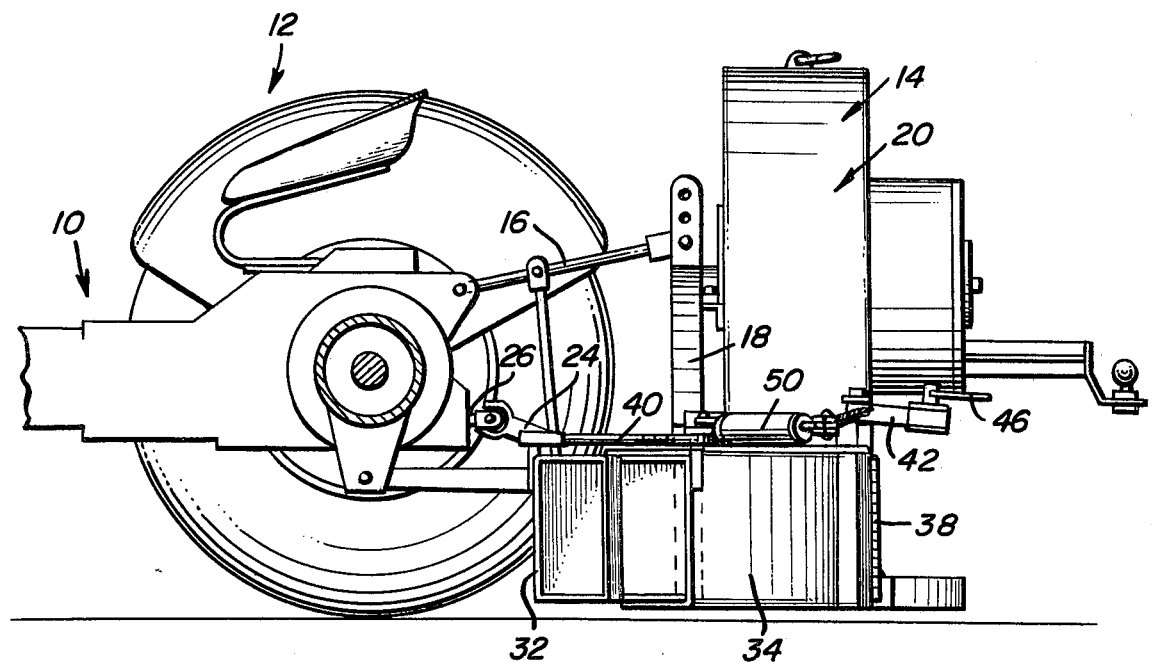
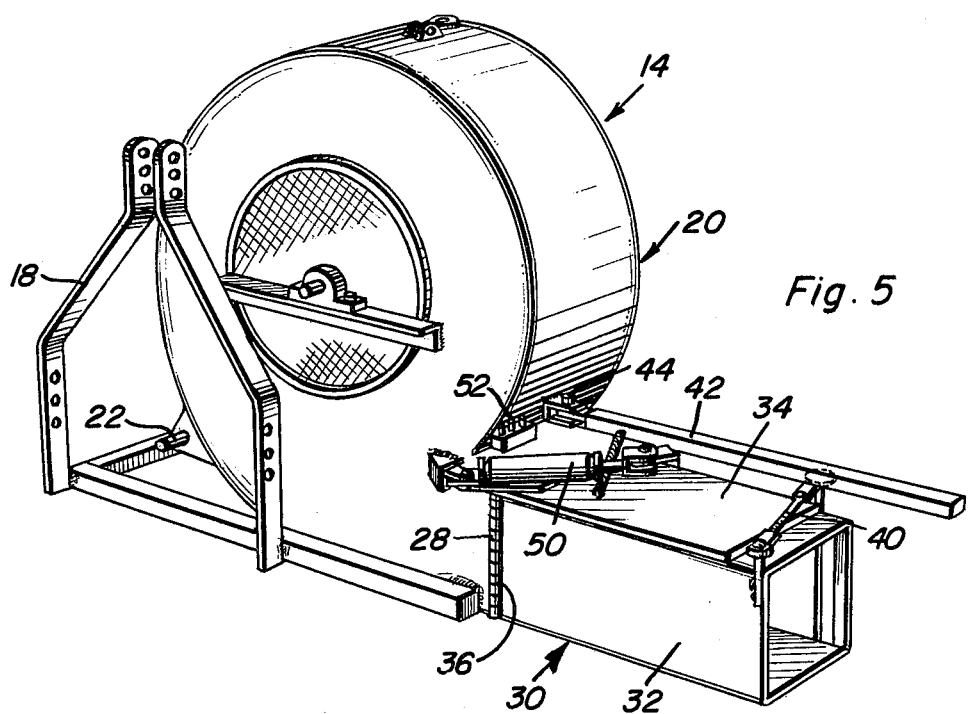
Fig. 5

TREE NUT WINDROWING BLOWER WITH AUTOMATIC OSCILLATING BLOWER DISCHARGE

BACKGROUND OF THE INVENTION

Various blower structures have been heretofore provided in the form of a mobile platform intended to move along a path oriented in predetermined position relative to the platform and with the latter provided with a discharge opening for the blower structure opening laterally outwardly of the aforementioned path. In this manner, the mobile platform may be moved along a path from which debris, ground supported nuts or fruits and other objects may be blown. Some forms of blower equipment of this type have been utilized to blow ground supported nuts from rows of nut trees into the areas between adjacent rows of nut trees. However, these blower units are not effective in blowing nuts as desired from immediately leaward of the trees from beneath which the nuts are to be blown. Accordingly, approximately 10% of ground supported nuts to be blown into the area between rows of nut trees are unaffected, at least to a substantial extent, by the discharge of air from previously known blower-type nut windrowing equipment. Accordingly, a need exists for blower equipment which may accomplish a more complete and thorough nut windrowing operation.

Examples of blower equipment including some of the basic structural and operational features of the instant invention are disclosed in U.S. Pat. Nos. 512,558, 622,706, 2,220,082 and 2,587,240.

BRIEF DESCRIPTION OF THE INVENTION

The instant invention resides in the provision of a mobile blower unit operative to discharge a high velocity flow of air laterally outwardly of the path of movement of the blower unit and including means whereby the path of the flow of air being discharged from the unit may be angularly displaced between extremes with the path inclined forwardly and rearwardly relative to the direction of movement of the blower unit in the extremes of angular displacement thereof. The blower unit further includes sensor means for sensing an object, such as a tree trunk, being passed by the blower unit and operative to oscillate the path of discharge of air from the blower between its extremes of angular displacement in response to an object being sensed by the sensor means or structure. In this manner, ground debris, fruits or nuts lying on the ground on the leaward side of a tree trunk may be windrowed into the area between adjacent rows of trees equally as well as ground debris, nuts and fruits lying on the ground between adjacent trees in a row of trees.

The main object of this invention is to provide a ground debris, nut and fruit windrowing blower structure which may be moved along one side of a row of trees and utilized to windrow ground debris, nuts and fruits from the ground in the row of trees into the area immediately alongside the other side of the row of trees.

Another object of this invention, in accordance with the immediately preceding object, is to provide a blower and constructed in a manner whereby it may be utilized as a self-propelled ground vehicle or supported from or propelled by supportive and draft units, respectively.

Still another object of this invention is to provide a blower unit including structure for variably angling the discharge of air therefrom and sensor structure for sensing an object being passed by the blower unit and oscillating the path of the discharge of air from the blower unit between its extremes of angular displacement in response to an object being sensed.

Yet another important object of this invention is to provide a blower structure, in accordance with the preceding objects, and including means by which the path of discharge of air from the blower unit may be rapidly angularly deflected in one direction and slowly angularly deflected in the reverse direction.

A final object of this invention to be specifically enumerated herein is to provide a blower structure, in accordance with the preceding objects, and which will conform to conventional forms of manufacture, be of simple construction and easy to use, so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a side elevational view of the assemblage illustrated in FIG. 3 with a portion of the tractor broken away and illustrated in vertical section;

FIG. 5 is a perspective view of the blower unit of the tractor mounted form of windrowing blower illustrated in FIGS. 1 through 4;

FIG. 6 is a fragmentary top plan view illustrating the discharge spout of the blower in an extreme of angular displacement opposite from the extreme position thereof illustrated in FIG. 3;

DETAILED DESCRIPTION OF THE INVENTION

Figure 1:
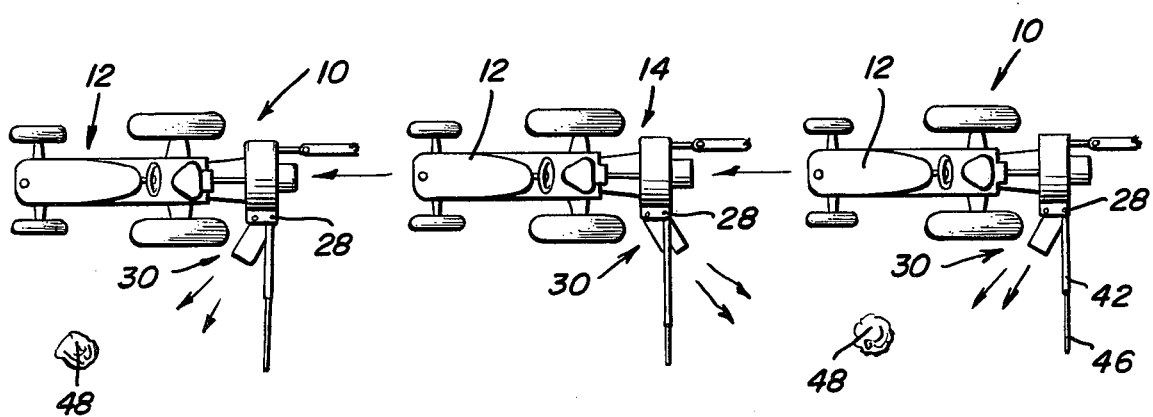
FIG. 1 is a top plan view of portions of adjacent rows of fruit trees, with the trees schematically illustrated, and a tractor mounted form of the windrowing blower of the instant invention illustrated in three successive positions of movement along one of the rows of trees.
Figure 2:
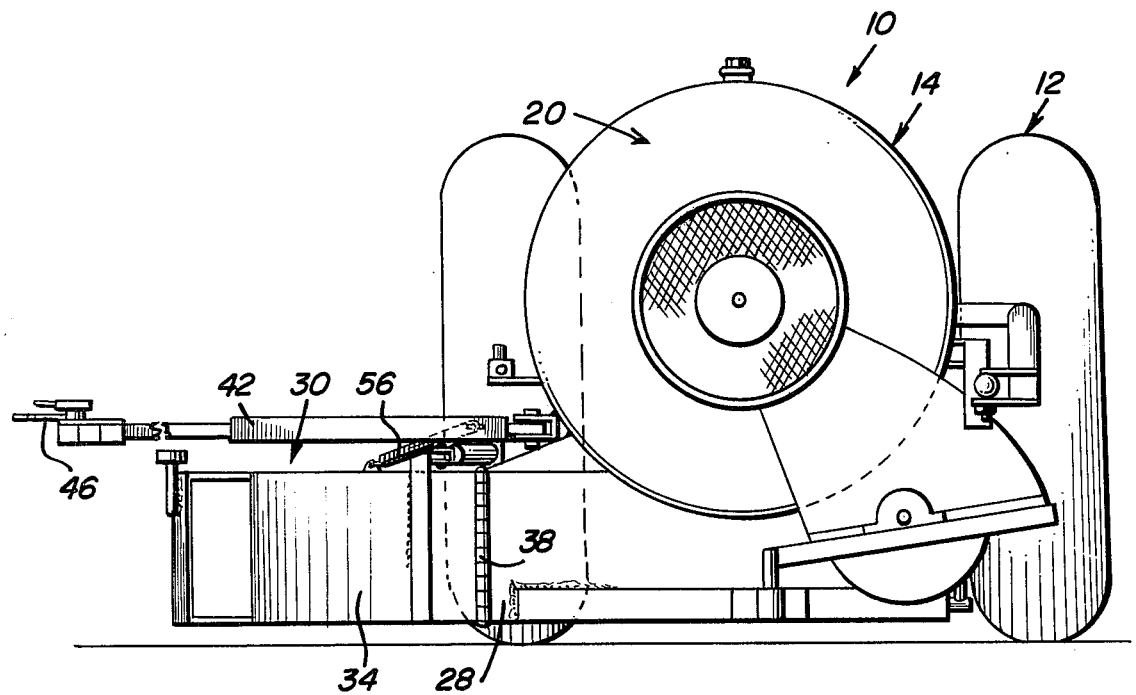
FIG. 2 is an enlarged rear elevational view of the tractor mounted form of windrowing blower illustrated in FIG. 1.

Referring now more specifically to the drawings, the numeral 10 generally designates a windrowing blower structure constructed in accordance with the present invention. The structure 10 includes a conventional form of farm tractor referred to in general by the reference numeral 12 and a blower unit referred to in general by the reference numeral 14. The tractor 12 includes the usual three-point hitch 16 and the blower unit 14 includes a support frame 18 for attachment to and support from the hitch 16 in a conventional manner.

The blower unit 14 further includes a centrifugal blower assembly referred to in general by the reference numeral 20 supported from the frame 18 and including an input shaft 22 driven by a drive shaft 24 coupled between the tractor power take-off shaft 26 and the shaft 22. The assembly 20 includes a discharge outlet 28 from which a jet discharge of air from the blower assembly 20 is directed during operation of the assembly 20. The outlet 28 has a discharge spout generally referred to by the reference numeral 30 supported therefrom and the spout 30 includes a pair of telescopingly engaged and relatively slidable horizontally elongated channel members 32 and 34 hingedly supported from the discharge outlet as at 36 and 38, respectively. The channel members 32 and 34 extend lengthwise outwardly from opposite sides of the discharge outlet 28 and have a connecting link 40 extending between and pivotally connected to the outer ends of the channel members 32 and 34. The link 40 is adjustable in length and the channel members 32 and 34 are connected together in parallelogram fashion by their pivotal connections with the discharge outlet 28 and the connecting link 40. Accordingly, the discharge spout 30 may be oscillated between the relatively angulated positions thereof illustrated in FIGS. 3 and 6 of the drawings.

With attention now invited more specifically to FIG. 1 of the drawings, it will be noted that the discharge outlet 28 opens laterally outwardly toward one side of the path of movement of the windrowing blower structure 10. Further, it may also be seen from FIG. 1 of the drawings that the discharge spout 30 is inclined forwardly and rearwardly relative to the direction of movement of the tractor 12 in the extreme positions of oscillation of the spout 30.

An elongated horizontally disposed and adjustable length sensor arm 42 is pivotally mounted on the blower assembly 20 as at 44 for oscillation in a horizontal plane about a vertical axis and the arm 42 projects laterally outwardly of the side of the structure 10 to which the blower assembly 20 discharges air. The outer end of the arm includes a pivotally mounted and spring biased sensor finger 46 for engagement with the tree trunks 48 in the row of trees along which the structure 10 moves, see FIGS. 1 and 3, and the sensor finger 46 is electrically connected to an electrically operable control (not shown) for a fluid cylinder 50 pivotally connected between the blower assembly 20 and the discharge spout 30, see FIGS. 5 and 6, whereby the cylinder 50 may be extended and retracted in order to cause oscillation of the discharge spout 30 between the extremes of oscillation thereof illustrated in FIGS. 3 and 6. The cylinder 50 may be extended by fluid pressure and includes an internal spring for retraction of the cylinder upon the latter being vented. The supply to and from the cylinder 50 is controlled by a control unit 52 mounted on the blower assembly 20 and operative to sequentially effect rapid swinging of the discharge spout 30 to the rear, a momentary pause at the termination of rearward swinging movement of the discharge spout 30 and then a slow swinging movement of the discharge spout 30 forward to the position thereof illustrated in FIG. 3.

Figure 3:
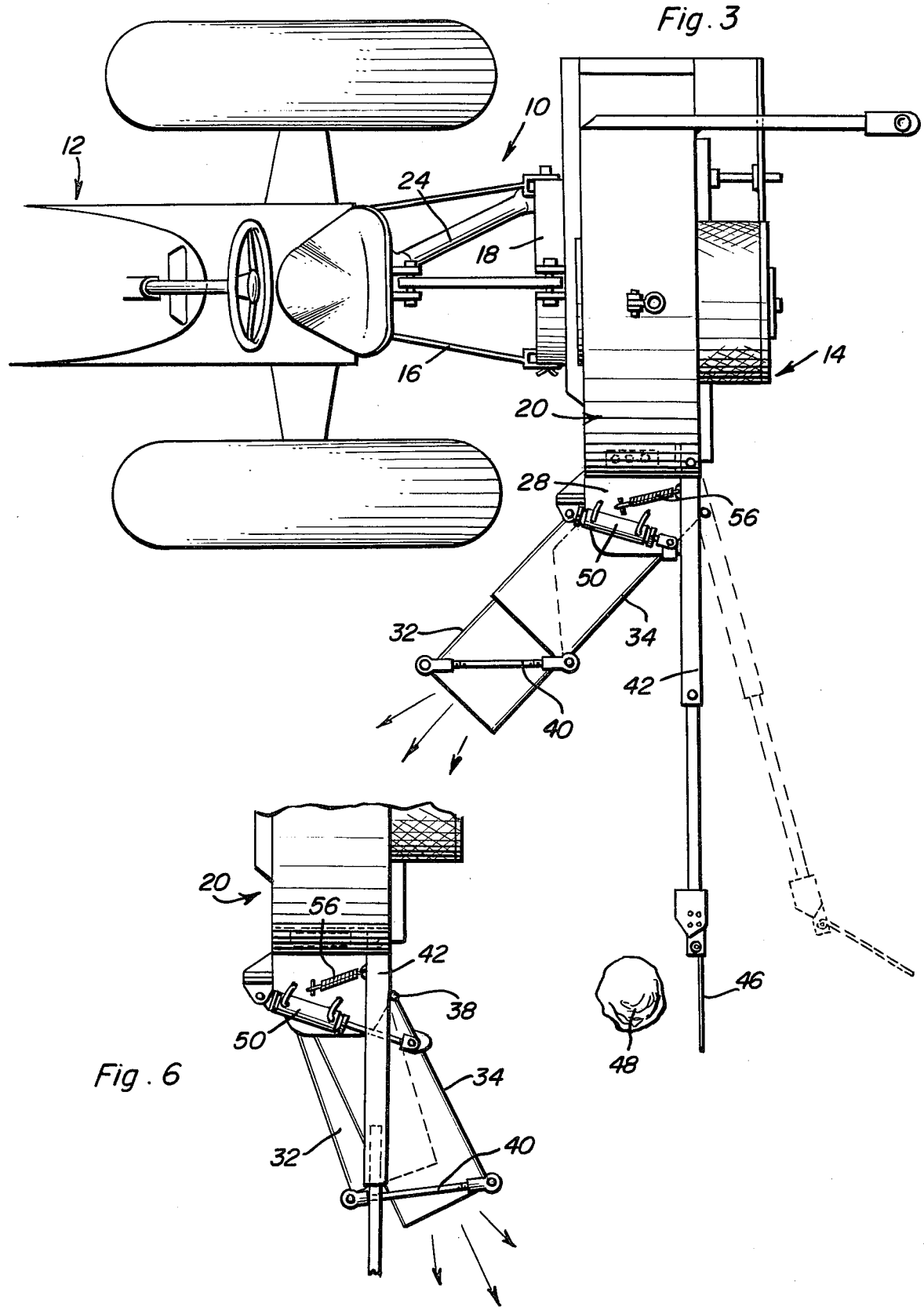
FIG. 3 is a fragmentary enlarged top plan view of the assemblage illustrated in FIG. 2 and with an alternate position of the tree trunk sensor thereof illustrated in phantom lines.

The sensor arm 42 is spring mounted in order to yield in the event it is unintentionally moved into engagement with a tree trunk and a spring 56 is operatively connected between the arm 42 and the discharge outlet 28 for returning the support arm 42 from a rearwardly deflected position, such as that illustrated in phantom lines in FIG. 3, to the rest position thereof, illustrated in solid lines in FIG. 3.

In operation, as the windrowing blower structure 10 moves along a row of trees, the normally forwardly inclined discharge spout 30 will cause the air discharged from the blower assembly 20 to be directed in a forwardly and outwardly inclined direction, such as that illustrated in the right hand portion of FIG. 1. Then, when the sensor finger 46 engages a tree trunk 48, the cylinder 50, operated either by air or liquid under pressure, is actuated to rapidly swing the discharge spout 30 to the rearwardly inclined position thereof illustrated in the center portion of FIG. 1, after which the discharge spout 30 experiences a termination of swinging movement and then slowly swings forward to the limit position of forward swinging movement thereof illustrated in the left hand portion of FIG. 1 before the next tree trunk 48 is encountered.

Figure 7:
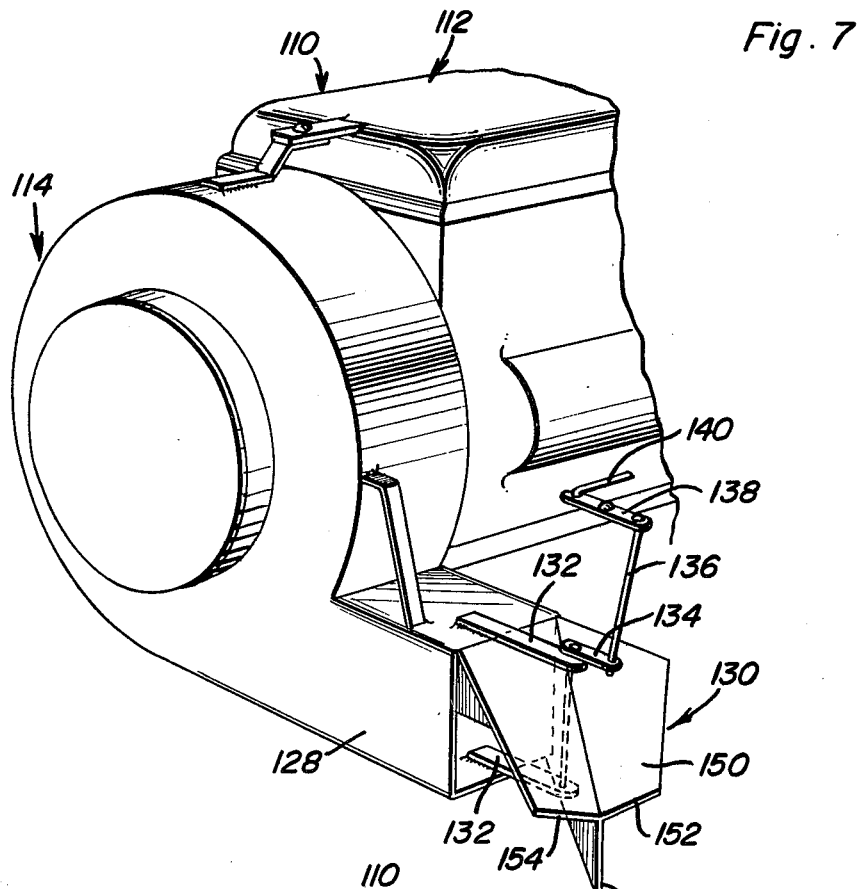
FIG. 7 is a fragmentary perspective view illustrating a modified form of windrowing blower structure.
Figure 8:
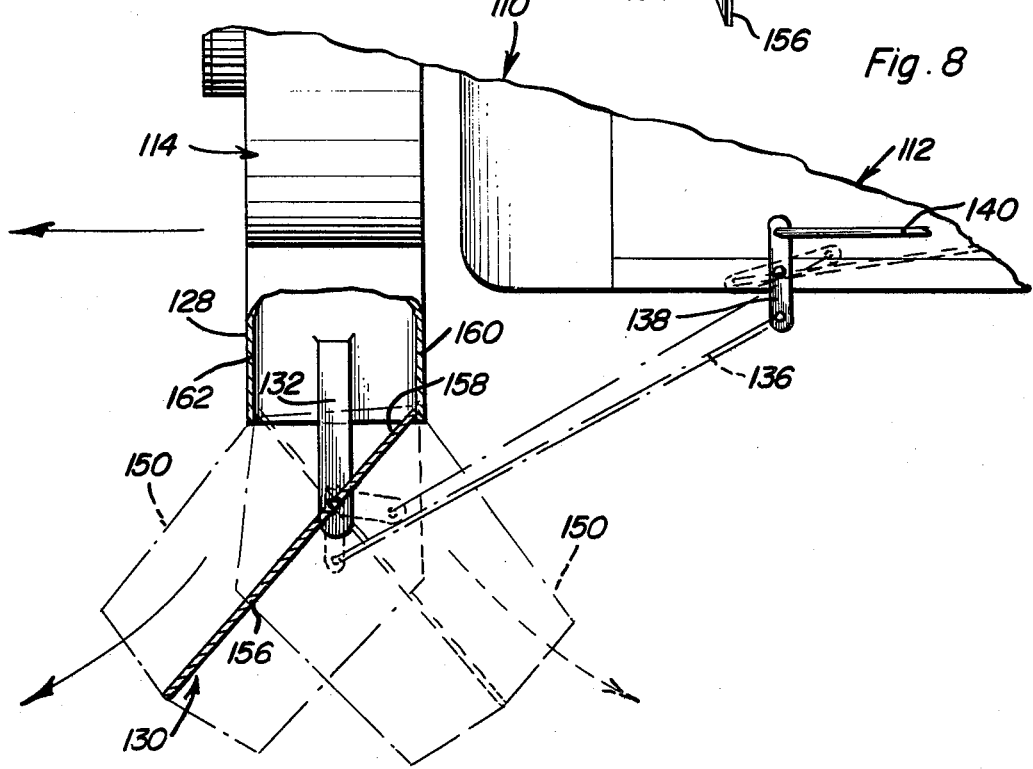
FIG. 8 is a fragmentary top plan view of the assemblage illustrated in FIG. 7 with portions of the blower unit and deflector structure thereof being broken away and illustrated in horizontal section.

With reference now more specifically to FIGS. 7 and 8 of the drawings, a second form of windrowing blower structure 110 is illustrated, including a mobile vehicle 112 on the front of which a blower unit 114 corresponding to the unit 14 is mounted. The unit 114 includes a discharge outlet 128 corresponding to the outlet 28, but instead of being provided with a discharge spout corresponding to the spout 30, the outlet 128 is provided with an oscillatable deflector unit referred to in general by the reference numeral 130. The outlet 128 includes upper and lower outwardly projecting supports 132 between which the deflector unit 130 is oscillatably supported for angular displacement about a substantially vertical axis. The deflector unit 130 includes a crank arm 134 supported therefrom to which one end of a connecting link 136 is pivotally connected and the other end of the connecting link 136 is connected to a first end of a lever 138 pivotally supported from the structure 112 and having an operating rod 140 connected to its other end, the operating rod 140 being connected to a fluid cylinder (not shown) corresponding to the cylinder 50 at its end remote from the lever 138. Further, the structure 110 includes a sensor arm and sensor finger corresponding to the arm 42 and finger 46 for operation of the immediately above referred to fluid cylinder. Accordingly, the deflector unit may be oscillated between the phantom and solid line positions thereof illustrated in FIG. 8 of the drawings in substantially the same manner in which the discharge spout 30 is oscillated between the extreme positions of oscillation of the spout 30 illustrated in FIGS. 3 and 6.

The deflector unit 130 includes a generally horizontal top plate 150, but the opposite side sections 152 and 154 thereof are slightly outwardly and upwardly deflected. The deflector unit 130 further includes a depending longitudinal central panel 156 from which the plate 150 is supported. From FIG. 8 of the drawings, it may be seen that the central panel 156 includes an inner end portion 158 thereof which is engaged with the inner surfaces of the opposite side walls 160 and 162 of the discharge outlet 128 in the extreme positions of oscillation of the deflector unit 130. Accordingly, the discharge of air from the discharge outlet 128 may be angulated both forwardly and rearwardly relative to the direction of movement of the structure 112 and oscillation of the deflector unit 130 between its limit positions of oscillation is controlled by structure corresponding to the sensor arm 42, the sensor finger 46 and the cylinder 50 and control 52. Therefore, the operational effect of the windrowing blower structure 110 is equivalent to the operational effect of the windrowing blower structure 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a mobile ground vehicle intended to move along a path oriented in a predetermined position relative to said vehicle, blower means mounted on said vehicle and including an outlet, deflector means operatively associated with said outlet for variably deflecting the discharge of air from said outlet through an arc of angular deflection disposed in a plane generally paralleling said path and including extremes variably inclined along said path, drive means operatively associated with said deflector means for driving the latter between the extremes of angular deflection thereof, object sensor means carried by said vehicle for sensing objects past which said vehicle is moved, and actuator means operatively associated with said sensor means and drive means for actuating the latter to oscillate said deflector means between said extremes of angular deflection in response to said sensor means sensing an object being passed by said vehicle.

2. The combination of claim 1 wherein said drive means includes means operative to effect oscillation between said extremes of angular deflection by fast movement from one extreme to the other and slow movement back from said other extreme to said one extreme.

3. The combination of claim 2 wherein said drive means also includes means operative to momentarily terminate oscillation of said deflector means intermediate successive periods of fast and slow movement.

4. In combination with a mobile ground vehicle intended to move along a path oriented in predetermined position relative to said vehicle, blower means mounted on said vehicle and including an outlet and deflector means operatively associated with said outlet for variably deflecting the discharge of air from said outlet through an arc of angular deflection disposed in a plane generally paralleling said path and including extremes inclined in opposite directions along said path, drive means operatively associated with said deflector means for driving the latter between the extremes of angular deflection thereof, object sensor means carried by said vehicle for sensing objects past which said vehicle is moved, and actuator means operatively associated with said sensor means and drive means for actuating the latter to oscillate said deflector means between said extremes of angular deflection in response to said sensor means sensing an object being passed by said vehicle.

5. The combination of claim 4 wherein said drive means includes means operative to effect oscillation between said extremes of angular deflection by fast movement from one extreme to the other and slow movement back from said other extreme to said one extreme.

6. The combination of claim 5 wherein said drive means also includes means operative to momentarily terminate oscillation of said deflector means intermediate successive periods of fast and slow movement.

7. The combination of claim 4 wherein said deflector means includes a pair of opposing side-by-side channel members opening toward and relatively telescopingly and slidably engaged with each other, one pair of corresponding ends of said channel members being pivotally supported from front and rear portions of said outlet for oscillation about upstanding axes and link means extending between and pivotally connected, at its opposite ends, to the other pair of ends of said channel members, whereby the latter are connected together in parallelogram fashion.

8. The combination of claim 7 wherein said drive means includes reversible motor means connected between said blower means and said deflector means for oscillatably swinging the latter relative to said outlet opening.

9. The combination of claim 4 said object sensor means including an outwardly projecting arm carried by said blower means including a shiftable sensor member on its outer end for engaging, and thereby sensing, a tree trunk, said sensor member being operatively connected to said actuator means for operation of said drive means in response to said sensor member striking a tree trunk.

10. The combination of claim 4 wherein said deflector means includes an oscillatable baffle supported in operative association with said outlet opening for variably deflecting the discharge of air therefrom.

11. The combination of claim 10 wherein said baffle includes an edge upstanding plate having an upper horizontal plate supported from the upper marginal edge thereof extending along said upstanding plate and projecting outwardly of opposite sides thereof.

12. The combination of claim 11 wherein the opposite side portions of said horizontal plate are slightly upwardly and outwardly inclined.

13. The combination of claim 10 including drive means operatively associated with said deflector means for driving the latter between the extremes of angular deflection thereof, said drive means including reversible motor means connected between said blower means and said deflector means for oscillatably swinging the latter relative to said outlet opening.

14. The combination of claim 13 wherein said object sensor means includes an outwardly projecting arm carried by said blower means including a shiftable sensor member on its outer end for engaging, and thereby sensing, a tree trunk, said sensor member being operatively connected to said actuator means for operation of said drive means in response to said sensor member striking a tree trunk.

* * * * *